RIPPON & JOHNSON.

Lamp Burner.

No. 3,805. Reissued Jan'y 25, 1870.

Witnesses.

Jno F Brooks

Edgar Tate

Inventors:

W. F. Rippon.

G. A. Johnson.

per Munn & Co.

Attorneys.

N. PETERS, Photo-Lithographer, Washington, D. C.

UNITED STATES PATENT OFFICE.

WILLIAM F. RIPPON AND GEORGE A. JOHNSON, OF PROVIDENCE, R. I.

IMPROVEMENT IN LAMP-BURNERS.

Specification forming part of Letters Patent No. 94,776, dated September 14, 1869; Reissue No. 3,805, dated January 25, 1870.

*To all whom it may concern:*

Be it known that we, WILLIAM F. RIPPON and GEORGE A. JOHNSON, of Providence, in the county of Providence and State of Rhode Island, have invented a new and Improved Lamp-Wick Adjuster; and we do hereby declare that the following is a full, clear, and exact description thereof, which will enable others skilled in the art to make and use the same, reference being had to the accompanying drawings, forming part of this specification.

The object of this invention is to provide an adjustable spring-presser for use in lamp-wick tubes for regulating the breadth of the wick-passage in the said tubes according to the wicks, which vary materially in thickness.

The said invention comprises, in connection with a friction-roller opposite the ratchet-wheel, a spring connected to the burner and projecting upward along the wick-tube, of the same width as the interior thereof, between which and one wall of the tube the wick passes, and is closely confined between the spring and the said wall of the tube by the spring, which is set to have a natural pressure in the direction of the said wall, the said pressure being governed by the friction-roller in a manner to avoid friction by the said spring on the wick, and the said spring and tube are grooved or corrugated, as a further means of reducing the friction thereat.

Figure 2:
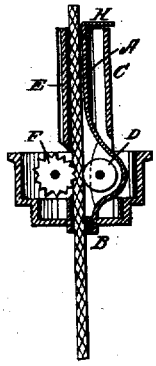
Figure 1:
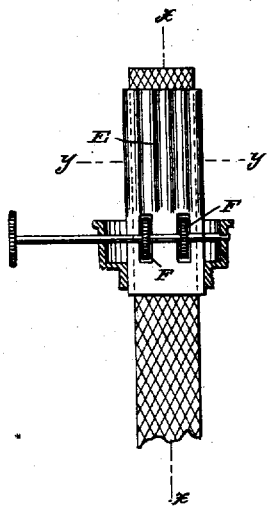
Figure 3:
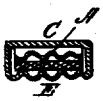

Figure 1 represents a sectional elevation of a burner and side elevation of a tube with our improvements applied. Fig. 2 represents a transverse sectional elevation of the same, taken at right angles to the plane of Fig. 1, and on the line *x x;* and Fig. 3 represents a horizontal section of the same, taken on the line *y y*.

Similar letters of reference indicate corresponding parts.

A represents a spring connected to the bottom of the burner at B and projecting upward in the tube C, bending around the friction-roller D, which is supported in bearings connected to the spring at the bend. This spring is so adjusted relatively to the roller and to the side E of the tube that when the roller presses the wick against the ratchets F with the proper force to insure the working of the wick up and down the upper end of the spring will press the wick against the side E of the tube with just sufficient force to close the passage against the escape of gas from the lamp below, but without sufficient friction to obstruct the free working of the wick.

The spring, at the part where it bears against the wick, and also the part of the wick-tube opposite and in conjunction with which it acts, are corrugated vertically to reduce the amount of the surfaces coming into contact with the wick, which we consider also reduces the friction.

It will be seen that by this arrangement the requisite pressure of the wick against the ratchets by the friction-roller to insure the working of the wick will always be had, whether the wick be thick or thin, and that the passage for the wick will always be adjusted to the thickness of the wick.

The passage behind the spring and between it and the other side of the wick-tube is closed by the bent end of the spring, as shown at H.

Having thus described our invention, we claim as new and desire to secure by Letters Patent—

1. The combination, in a wick-tube of a kerosene or other oil lamp, of a spring, A, and friction-roller D, acting in conjunction with the ratchet and the wick-tube, substantially as specified.

2. Also, the combination of the same, when the said spring and the part of the tube in which it acts are corrugated, and all constructed and arranged substantially as specified.

The above specification signed by us this 21st day of September, 1869.

WILLIAM F. RIPPON.
GEO. A. JOHNSON.

Witnesses:
GEO. W. MABEE,
ALEX. F. ROBERTS.